June 19, 1951  A. J. HANSSEN  2,557,187
PRESSURE REGULATOR
Filed March 15, 1948
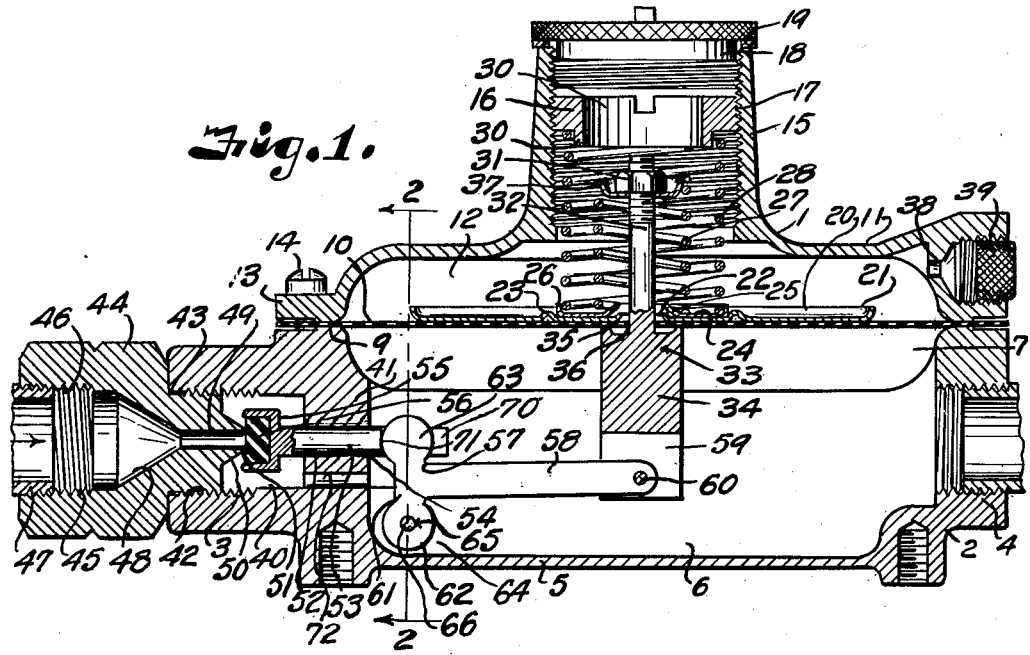
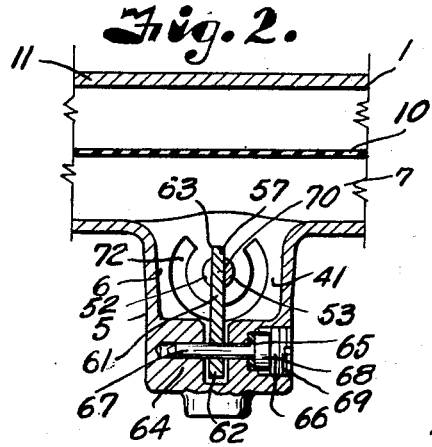
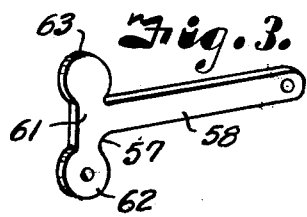
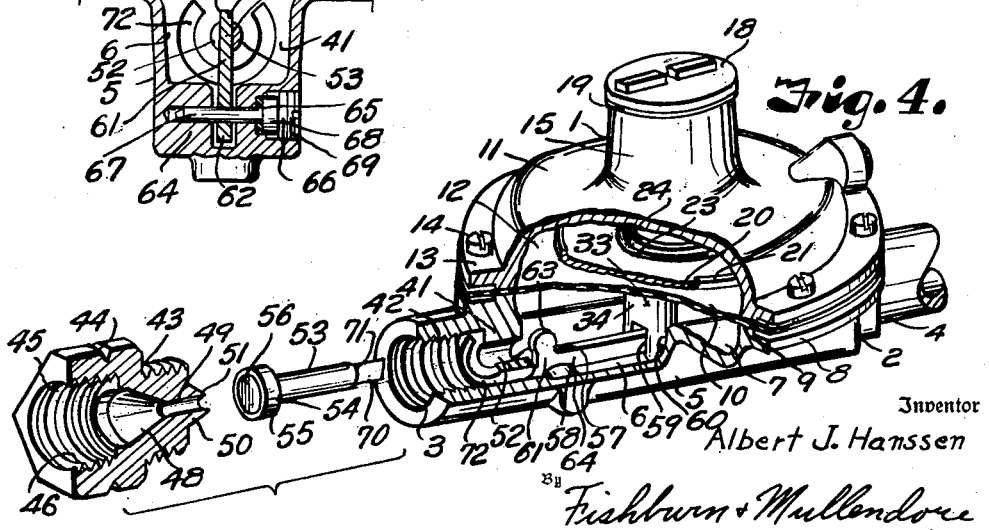
Inventor
Albert J. Hanssen
By Fishburn & Mullendore
Attorneys

Patented June 19, 1951

2,557,187

UNITED STATES PATENT OFFICE 2,557,187

PRESSURE REGULATOR

Albert J. Hanssen, Tulsa, Okla., assignor to Black, Sivalls & Bryson, Inc., Kansas City, Mo., a corporation of Delaware Application March 15, 1948, Serial No. 14,870

2 Claims. (Cl. 50—26)

This invention relates to pressure regulators for reducing pressure of a gas by expansion through a diaphragm controlled valve, the principal object being to provide a regulator of this character which eliminates entrapment of any moisture that may be entrained with the gas, thereby reducing freeze-ups around the valve and valve operating connections incidental to low temperatures resulting from expansion of the gas.

Other objects of the invention are to provide a regulator structure which permits ready removal of the valve and seat elements for inspection or replacement without the use of special tools; to provide for complete removal of the valve and seat elements through the inlet connection of the regulator so as to avoid any disassembly of parts which might destroy factory adjustments; to provide a valving element which serves as a check to prevent backflow through the regulator when the piping system on the upstream side is disconnected or under repair, thereby preventing loss of gas and possibility of air entering into the lines which might cause flashbacks of dangerous magnitude; and to provide a regulator of simple and inexpensive construction.

In accomplishing these and other objects of the invention, I have provided improved structure, the preferred form of which is illustrated in the accompanying drawing wherein:

Fig. 1 is a vertical section through a pressure regulator constructed in accordance with the present invention.

Fig. 2 is a fragmentary cross section through the regulator on the line 2—2 of Fig. 1.

Fig. 3 is a perspective view of the valve actuating lever of the regulator.

Fig. 4 is a perspective view of the regulator with parts broken away to better illustrate the interior construction and to show the manner of removing the valve seat and valving elements through the inlet connection of the regulator.

Referring more in detail to the drawings:

1 designates a pressure regulator embodying the features of the present invention and which includes a body casing 2 having an inlet 3 at one side and an outlet 4 at the other which are interconnected by a duct 5 forming an integral part of the body casing and which provides an expansion chamber 6 opening at one side into a lower diaphragm chamber 7.

The diaphragm chamber 7 is encircled by a flange 8 forming an annular seat 9 for a flexible diaphragm 10 which closes the lower diaphragm chamber. Seated against the opposite face of the diaphragm is a diaphragm casing 11 forming an upper chamber 12 encircled by a flange 13 corresponding to the flange 8 and cooperating therewith to clamp the diaphragm therebetween when fastening devices such as cap screws 14 are inserted through suitable openings in the flange 13 and threaded into openings in the flange 8. The diaphragm casing 11 also includes an internally threaded tubular boss 15 that projects outwardly therefrom and which mounts a spring adjusting ring 16, the ring 16 having threads 17 engaging the threads of the tubular boss. The outer end of the tubular boss is closed by a cap 18 which is threaded thereinto and provided with a knurled flange to clamp a gasket 19 therebetween so as to exclude moisture and other elements from entering the casing.

The diaphragm 10 is preferably provided with a diaphragm plate 20 having an upturned annular rim 21, an axial opening 22 and an intermediate annular rib 23. Seated on the diaphragm plate and retained in coaxial relation with the opening 22 is a spring seating ring 24 having inner and outer upturned flanges 25 and 26 for retaining coaxial alignment of inner and outer coil springs 27 and 28 which extend upwardly within the tubular boss. The upper end of the outer spring seats against the adjusting ring and is retained in position by a flange 30 depending from the ring in encircling relation with a central opening 30 in the adjusting ring through which access is had to the adjusting nut 31 that is mounted on the stem 32 of a relief valve 33. The relief valve 33 has a head portion 34 which is of larger diameter than the stem and which is provided with an annular rib or seating flange 35 that engages against the diaphragm in encircling relation with the opening 22 in the diaphragm plate 20. The stem 32 of the relief valve extends upwardly through an axial opening 36 in the diaphragm and through the opening 22 to mount a spring seat 37 that engages the upper end of the inner spring and which retains a predetermined adjustment thereof upon tightening of the nut 31. The relief valve is thus retained in sealing engagement with the diaphragm by action of the inner coil spring but is adapted to unseat under certain differential pressures which may occur on the respective sides of the diaphragm. The upper diaphragm chamber is vented through an orifice 38 that is provided in the bottom of an internally threaded bore of a boss extending laterally from the upper diaphragm casing. Preferably threaded into the bore is a vent screen 39 to prevent entrance of external elements into the diaphragm casing.

The inlet connection 3 has an axial bore 40 separated from the passageway 6 by a transverse partition 41. The bore is provided with internal threads 42 to connect an inlet orifice member 43. The member 43 has a polygonal-shaped body 44 to permit application of a wrench or the like for removing the orifice member as later described. The orifice member also includes an externally threaded neck of smaller diameter which engages within the threads 42. The body portion of the orifice member has an axial bore 45 that is provided with internal threads 46 for connecting the inlet pipe 47 to which gas is supplied to the regulator. The bore 45 terminates in a funnel-shaped passageway 48 that connects with an axial orifice 49 which extends through a conical boss 50 forming an annular seat 51 at the outlet end of the orifice.

The partition 41 has an opening 52 coaxial with the orifice to slidably mount the stem 53 of a valving element 54 which includes a cup-shaped head 55 that retains a valve facing material 56 therein to engage the seat 51. The stem 52 is of sufficient length to project from the partition for connection with the diaphragm 10 by means of a lever 57 and the relief valve 33.

In carrying out the present invention, the lever 57 is of T shape and formed of flat material to provide a stem 58 which extends into a slot 59 of the relief valve to be attached thereto by a pin 60 preferably formed of stainless or corrosive-resistant material. The head 61 of the lever extends transversely of the stem and has rounding terminals 62 and 63, the terminal 62 being engaged between spaced lugs 64 of the casing 2 and pivotally connected therewith by a pin 65. The pin 65 is inserted through an opening 66 in the side of the casing as shown in Fig. 2. The opening extends through the lugs 64 to accommodate the shank 67 of the pin and the outer end is counterbored to receive a head 68 of the pin. The pin is retained in position by a plug 69 that is threaded into the counterbore. The lever is thus pivotally connected with the diaphragm and housing, but the terminal 63 merely engages against a shoulder 70 of a notch 71 that is formed in the valve stem so that the valve may be withdrawn through the inlet connection when the orifice and seat element is removed.

Moisture entrained with the gas may tend to collect within the valve chamber around the valve stem and the connections for the valve actuating lever and to overcome this difficulty the gas discharged from the orifice is passed into the passageway or expansion chamber through a U-shaped port 72 formed in partition with the base of the U registering with the periphery of the counterbore so that any moisture entering the valve chamber will be swept by the gas through the port and away from the stem and lever connections through the outlet of the regulator.

The opening 52 in the partition 41 conforms to the cross sectional shape of the valve stem so as to reduce the possibility of moisture collecting therein and that the U-shaped slot provides passage for the expanding gas.

Assuming that the regulator is constructed and assembled as described and that it is connected within a gas line for reducing and maintaining a uniform low pressure on the downstream side, the gas enters the passage 48 under high pressure and unseats the valve 55. The gas expands to a lower pressure and blows through the U-shaped port 71 through the passageway 6 and into the line on the downstream side of the valve. When the pressure of the gas acting on the underside of the diaphragm reaches the set pressure, that is, when the pressure on the diaphragm overcomes the spring pressure the diaphragm moves to rock the lever 57 in an anti-clockwise direction (Fig. 1) and effect seating of the valve until the low pressure again drops through use of the gas on the downstream side of the regulator, whereupon the spring becomes effective to permit unseating of the valve until the set pressure is reached. Actually the valve maintains a position whereby a balance exists to assure discharge of the gas at predetermined pressure as drawn upon by the downstream system.

In case the upstream piping is disconnected for any reason, the valve seats automatically to prevent entrance of air into the downstream system that might cause dangerous "flashbacks" when the connections are re-established. The check valve feature also prevents loss of gas from the downstream portion of the system. Any moisture contained with the gas is carried therewith through the U-shaped port and discharged to the downstream system. Therefore, the moisture cannot be trapped within the valve chamber or collect upon any of the operating parts where it is likely to freeze because of low temperatures resulting from expansion of the gas.

When it is desired to inspect the valve and seat, the member 43 is unscrewed from the regulator after which the valve is readily withdrawn since it is not connected with the actuating lever. After inspection, the orifice and valve are readily replaced or new parts substituted without destroying factory adjustment on the springs or valve actuating connections.

What I claim and desire to secure by Letters Patent is:

1. A regulator of the character described including a casing, having a valve chamber provided with an inlet and a diaphragm chamber provided with an outlet, a partition in the casing separating said chambers and having a valve stem guide opening of smaller size than the valve chamber and having a port separate from and offset from the guide opening through which a pressure fluid is adapted to be discharged from the valve chamber into the diaphragm chamber, a diaphragm in the diaphragm chamber and adapted to be actuated by pressure of the fluid in the diaphragm chamber, a valving member in the valve chamber having a head for controlling flow from said inlet and of smaller diameter than the valve chamber to provide an annular passageway immediately around said head, said valving member having a stem closely reciprocable in the guide opening to support the valve head in overhanging relation with said partition and maintain said passageway immediately surrounding said head and an operating connection between the stem of the valving member and the diaphragm, said offset port being connected with said passageway and shaped in conformity with the cross sectional shape of the lower portion of the valve chamber to prevent collection of any moisture contained in the fluid admitted through said inlet when the regulator is in use.

2. A regulator of the character described including a casing, having a valve chamber provided with an inlet and a diaphragm chamber provided with an outlet, a partition in the casing separating said chambers and having a valve stem guide opening of smaller diameter than the valve chamber and having a substantially U-shaped port extending around the lower portion of the guide opening and spaced therefrom for discharge of pressure fluid from the valve chamber into the diaphragm chamber, a diaphragm in the diaphragm chamber and adapted to be actuated by pressure of the fluid in the diaphragm chamber, a valving member in the valve chamber having a head for controlling flow from said inlet of smaller diameter than the valve chamber to provide an annular passageway immediately around said head, said valving member having a stem closely reciprocable in the guide opening to support the valve head in overhanging relation with said partition and maintain said passageway immediately around said head and an operating connection between the said stem of the valving member and the diaphragm, said connection being protected by the partition from any moisture entrained with the pressure fluid and said U-shaped portion of the U-shaped port being connected with said passageway and conforming with the radius of the valve chamber to assure outlet of any entrained moisture with said fluid.

ALBERT J. HANSSEN.

REFERENCES CITED

The following references are of record in the file of this patent:

UNITED STATES PATENTS

| Number | Name | Date |
|--------|------|------|
| 357,720 | Livingston | Feb. 12, 1887 |
| 484,458 | Rinderknecht | Oct. 18, 1892 |

FOREIGN PATENTS

| Number | Country | Date |
|--------|---------|------|
| 42,726 | Sweden | June 27, 1917 |
| 777,616 | France | Nov. 15, 1933 |